United States Patent
Chang et al.

(10) Patent No.: US 6,788,489 B1
(45) Date of Patent: Sep. 7, 2004

(54) EMPLOYING OFF-TRACK CAPABILITY IN DATA ACCESS OPERATIONS IN A DIRECT ACCESS STORAGE DEVICE

(75) Inventors: Thomas Young Chang, San Jose, CA (US); Louis Joseph Serrano, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 0 days.

(21) Appl. No.: 09/567,473

(22) Filed: May 9, 2000

(51) Int. Cl.[7] .............................................. G11B 5/596
(52) U.S. Cl. .................................................. 360/77.08
(58) Field of Search .......................... 360/77.08, 78.07, 360/53; 711/112, 113

(56) References Cited

U.S. PATENT DOCUMENTS

| | | | | |
|---|---|---|---|---|
| 4,616,276 A | * | 10/1986 | Workman | 360/77 |
| 4,967,293 A | * | 10/1990 | Aruga et al. | 360/78.12 |
| 4,974,109 A | * | 11/1990 | Hoshimi et al. | 360/77 |
| 5,012,460 A | * | 4/1991 | Popovich et al. | 369/32 |
| 5,396,379 A | * | 3/1995 | Mayo | 360/78.04 |
| 5,526,201 A | * | 6/1996 | Takata et al. | 360/77.04 |
| 5,526,202 A | * | 6/1996 | Blagaila | 360/77.08 |
| 5,586,306 A | * | 12/1996 | Romano et al. | 395/500 |
| 5,615,063 A | * | 3/1997 | Kuroki et al. | 360/66 |
| 5,796,546 A | * | 8/1998 | Sasamoto et al. | 360/78.04 |
| 5,825,578 A | * | 10/1998 | Shrinkle et al. | 360/77.08 |
| 5,831,782 A | * | 11/1998 | Kohno et al. | 360/46 |
| 5,903,411 A | * | 5/1999 | Tomita et al. | 360/78.14 |
| 5,940,250 A | * | 8/1999 | McNeil et al. | 360/246.6 |
| 6,084,733 A | * | 7/2000 | Ohzeki et al. | 360/53 |
| 6,195,222 B1 | * | 2/2001 | Heminger et al. | 360/78.04 |
| 6,426,843 B1 | * | 7/2002 | Lamberts et al. | 360/75 |
| 6,445,521 B1 | * | 9/2002 | Schaff et al. | 390/31 |

FOREIGN PATENT DOCUMENTS

| | | | | |
|---|---|---|---|---|
| JP | 05182382 | * | 12/1991 | G11B/21/10 |
| JP | 05282808 | * | 3/1992 | G11B/21/08 |
| JP | 1050013 | * | 8/1996 | G11B/21/10 |

OTHER PUBLICATIONS

Optimum Track Width Determination Method, IBM Technical Disclosure Bulletin vol. 31 No. 12 May 1989, 449–451.

Yuan Qin, Off–track bit error rate modeling, Journal of Applied Physics vol. 85 No. 8 Apr. 15, 1999, pp. 4985–4987.

Sivadasan KK, A novel sensitivity function for MR heads and an application, IEEE Transactions on Magnetics vol. 35 No. 2 Pt. Mar 1, 1999, pp. 661–666.

* cited by examiner

Primary Examiner—David Hudspeth
Assistant Examiner—K. Wong
(74) Attorney, Agent, or Firm—Kunzler & Associates (57) ABSTRACT

A direct access storage device (DASD) employs head-specific off-track read capability (OTRC) in data access operations. A method of operation of the DASD involves providing within the DASD a rotating data storage medium and one or more read heads positionable for interaction with the data storage medium. The OTRC particular to each read head is determined and then applied in accessing data from the data storage medium. One manner of applying the OTRC to access data is to use the OTRC in scheduling random queued seeks. The OTRC for a head is referenced within buffer memory and applied to determine which target data can be accessed most quickly. The seeks are scheduled accordingly. A single table with a nominal seek time can be used for all heads, with a custom adder being added for each particular head. The OTRC can also be applied to alter the seek algorithm. That is, a given seek operation can be conducted more aggressively where the head involved has more favorable OTRC and less aggressively where a head with a less favorable OTRC is involved.

31 Claims, 11 Drawing Sheets

EMPLOYING OFF-TRACK CAPABILITY IN DATA ACCESS OPERATIONS IN A DIRECT ACCESS STORAGE DEVICE

BACKGROUND OF THE INVENTION

1. The Field of the Invention

The present invention relates to direct access storage drives having a rotating media. More specifically, the present invention relates to manners of improving data access in a direct access storage drive using knowledge of the particular values of off-track read capability of the heads within the drive.

2. The Relevant Technology

Computer systems generally utilize auxiliary storage devices on which data can be written and from which data can be read for later use. A direct access storage device (DASD) is a common auxiliary storage device which incorporates rotating magnetic disks for storing data in magnetic form on concentric, radially spaced tracks on the disk surfaces. Transducer heads driven in a path generally perpendicular to the drive axis are used to write data to the disks and read data from the disks.

Current DASDs typically utilize a head for reading or writing data onto the various tracks and an actuator connected by a support arm assembly to the head for moving the head to the desired track and maintaining it over the track centerline during read or write operations. The movement of the head to a desired track is referred to as data seeking, or merely "seeking." Maintaining the head over the center line of the desired track during a read or write operation is referred to as track following or "tracking."

DASD systems are required to position each data head over the proper radial location for writing a track and return the data head very close to the same location when reading the track. Current DASD systems, such as hard disk drives, use a voice coil type of actuator and a control device with a feedback response to locate and consistently maintain the head over a given track. Typically, seeking and tracking are enabled by magnetically written patterns on the disk surface. The patterns generally take the form of prerecorded tracking servo marks. The servo marks are read by the transducer head and transmitted to a control unit, which utilizes the servo marks to set and correct the trajectory of the transducer head.

The actuator is typically a voice coil motor (VCM) which comprises a coil movable throughout the magnetic field of a permanent magnetic stator. The application of current to the VCM causes the coil and thus the attached head to move radially. In the absence of bias forces, the acceleration of the coil is proportional to the applied current. This current is applied by a power amplifier in response to a control input. If the input control is small enough, then the applied current is proportional to the control input and the power amplifier is nonsaturated; if the control input is too large, the applied current reaches a maximum possible value, and the power amplifier is saturated.

In disk files which have a relatively high density of data tracks on the disk, it is necessary to incorporate a servo control system to efficiently move the head between tracks and to maintain the head precisely over the centerline of the desired track during read or write operations. This is accomplished by utilizing prerecorded servo information either on a dedicated servo disk or on sectors angularly spaced and interspersed among the data on a data disk. The servo information sensed by the read/write head (or the dedicated servo head if a dedicated servo disk is used) is demodulated to generate a position error signal (PES) which is an indication of the position error of the head away from the nearest track centerline and to detect the track number or position sample.

In a DASD digital servo control system, a microprocessor utilizes a control signal algorithm to calculate a digital control signal based upon the digital values of certain state variables such as head position, VCM current, and head velocity. The digital control signal is converted to an analog signal and amplified to provide input current to the VCM. Such a digital servo control system is described in assignee's U.S. Pat. No. 4,679,103, incorporated by reference herein. The described system, as a part of the computation of the control signal to the actuator, makes use of the state estimator algorithm to estimate the state (i.e., position, velocity, and acceleration or current input to the VCM) of the head. In this type of system, a microprocessor receives, at discrete sample times, digital values corresponding to the PES, position sample, and the VCM input current, and computes through the use of the state estimator algorithm, a digital control signal. The digital control signal is then converted to an analog signal to provide a power amplifier control signal. A power amplifier then generates a new VCM input current.

One area of system performance in which there is room for improvement is in dealing with the off-track read capability (OTRC) of a head. As the track pitch of a DASD becomes smaller, manufacturing variations of the head manifests itself as a larger relative distribution of read and write performance. Coupled with other factors, such as servo positioning or channel robustness, this distribution can be an important component of the overall system performance.

Variations in head sizes that result from the manufacturing of a DASD can yield OTRC values that range from 15 to 30 percent of the track pitch. Head width is the primary variable in the OTRC of a head. Other variables, including head composition and sensitivity, spindle rotational speed, track pitch, and fly height of the head. While these latter variables must be considered, they generally do not vary within a DASD design.

Also, in order to improve the overall performance of the drive, seek order scheduling is conducted to improve throughput. That is, the seeks are not performed in the order received, but the order is rearranged so that more seeks can be conducted in a given time. To best rearrange the order, the microprocessor is generally provided with a table of read and write times versus seek length to predict how long a seek will take.

The prior art currently selects a single OTRC and incorporates that OTRC into its table of seek time versus seek length estimates. Only a single preselected OTRC is used for each head in a DASD and for each DASD of a given design. Generally, the OTRC value used must be a worst case or near worst case OTRC for all heads of all DASDs of the given design. Such methods have been found by the inventors to leave much room for improving seek latency.

Accordingly, a need exists for an apparatus and method for applying the head-specific OTRC to seeking and tracking operations within a DASD, such that seek latency may be improved and tracking may be optimized.

OBJECTS AND BRIEF SUMMARY OF THE INVENTION

The apparatus of the present invention has been developed in response to the present state of the art, and in particular, in response to the problems and needs in the art that have not yet been fully solved by currently available direct access storage devices. Thus, it is an overall objective of the present invention to provide a system and method for employing off-track read capability in data access operations in a direct access storage device.

To achieve the foregoing object, and in accordance with the invention as embodied and broadly described herein in the preferred embodiments, a DASD system and method for employing customized off-track read capability (OTRC) in accessing data on a direct access storage device (DASD) is provided.

In one embodiment, the DASD comprises a rotating data storage medium; a read head positionable for interaction with the data storage medium; and a control unit for positioning the read head with respect to the data storage medium. Preferably, the control unit comprises an off-track read capability (OTRC) storage module configured to store an indicator of an OTRC particular to the read head and an access module configured to apply the OTRC in accessing data from the data storage medium. The data access module is, in one embodiment, configured to apply the OTRC to generate an improved read time estimate for optimal scheduling of data operations. The OTRC is preferably measured during manufacturing of the DASD.

In one embodiment, the access module comprises a seek module configured to apply the OTRC dynamically during a data seeking operation, while in another embodiment, the access module comprises a tracking module configured to apply the OTRC dynamically during a data tracking operation. In applying the OTRC in the data seeking operation, it is used to calculate an improved estimate of read time. This estimate can then be employed directly in conducting the seek operations, or may be employed in queuing seeks in random queued data access operations.

The control unit may comprise a servo control loop that uses the OTRC to determine a seeking control and/or a tracking control law. The parameters of the servo control in one embodiment are changed by applying the OTRC.

In one embodiment, the control unit comprises a data seek algorithm and is configured to apply the OTRC to the data seek algorithm to determine an optimal trajectory of the head to the target data. A queuing module may be provided within the control unit and may be configured to apply the OTRC in ordering a random queued seek operation.

In one embodiment, the OTRC storage module comprises a table of time-to-data values for various numbers of tracks traversed, the table incorporating the OTRC specific to the head. In an alternative embodiment, the OTRC storage module comprises a standard table of time-to-data values for various numbers of tracks traversed and an adder corresponding to the OTRC. In yet another embodiment, the OTRC storage module comprises a plurality of tables of time-to-data for various numbers of tracks traversed, each of the plurality of tables specific to an OTRC or range of OTRC.

The DASD may, in one embodiment, also be provided with a buffer memory in communication with the control unit, an OTRC indicator particular to each read head, the OTRCs stored in the buffer memory, and a queuing module disposed within the control unit. Preferably, the queuing module is configured to receive a queue of target data to be accessed from the data storage medium into the control unit, determine the physical locations of the target data, access the specific OTRCs for one or more heads involved, determine, using the one or more OTRCs and the physical target location and the physical starting location, which of the target data can be accessed most quickly, and access said target data that can be accessed most quickly prior to the other target data.

The OTRC indicator particular to each read head may comprise a table specific to the head, the table containing access times for various amounts of tracks to be traversed in accessing target data. Alternatively, the OTRC indicator particular to each read head may comprise an adder specific to the head stored within buffer memory. Accordingly, the queuing module is, in this embodiment, configured to consult a table containing nominal access times for various amounts of tracks to be traversed in accessing target data, extract a time-to-data value from the table, reference the adder, and add the adder to the time-to-data value.

The access module may comprise a seeking module disposed within the control unit. In one embodiment, the seeking module is configured to receive a physical address of target data, receive the OTRC of the head involved in accessing the target data, and apply the OTRC to pick the optimal seek and/or tracking parameters for that OTRC. The seek is then performed to access the data at the target location.

An attendant method for employing customized off-track read capability (OTRC) in accessing data on a direct access storage device (DASD) comprises providing a DASD having a rotating data storage medium and a read head positionable for interaction with the data storage medium, determining the OTRC particular to the read head, and applying the OTRC in accessing data from the data storage medium.

Applying knowledge of the OTRC in accessing data from the DASD may comprise applying the OTRC dynamically during a seek operation and may also comprise applying the OTRC dynamically during a tracking operation. In one embodiment, determining the OTRC comprises measuring the OTRC of the read head during manufacturing of the DASD.

The method may further comprise providing a servo control loop within the DASD, and applying the OTRC in accessing data from the data storage medium may comprise applying the OTRC within the servo control loop. Preferably, the OTRC is applied to determine an optimal servo loop for seeking and/or tracking.

In one embodiment, applying the OTRC comprises applying the OTRC to a data seek algorithm to determine an optimal trajectory of the head to the target data. In yet another embodiment, applying the OTRC comprises applying the OTRC to a seek queuing algorithm to determine the order of seeking a plurality of blocks of target data by improving the read time estimates.

Applying the OTRC may also comprise referencing a table of time-to-data for various numbers of tracks traversed, the table incorporating the OTRC specific to the head. Additionally, applying the OTRC may comprise referencing a standard table of time-to-data values for various numbers of tracks traversed and applying an adder corresponding to the OTRC. Applying the OTRC may also comprise referencing from among a plurality of tables of time-to-data for various numbers of tracks traversed, each of the plurality of tables specific to a OTRC, a table with an OTRC specific to the head.

Under an additional embodiment, the DASD comprises a plurality of read heads and determining the OTRC particular to the read head comprises measuring the OTRC of each of the plurality of read heads and recording the OTRCs on a reserved area on the data storage medium. In this embodiment, applying the OTRC in accessing data from the data storage medium comprises providing a control unit having access to a buffer memory within the DASD, transferring the OTRCs from the reserved area to the buffer memory, receiving a queue of target data to be accessed from the data storage medium into the control unit, determining the physical locations of the target data, accessing the specific OTRCs for one or more heads involved, determining, using the one or more OTRCs, which of the target data can be accessed most quickly, and accessing said target data that can be accessed most quickly prior to the other target data. In one embodiment, the transfer of data to the buffer area from the reserved area happens only at the spin up of the drive.

Under this embodiment, accessing the specific OTRCs for one or more heads involved comprises consulting a table specific to the head, the table containing access times for various amounts of tracks to be traversed in accessing target data. Alternatively, accessing the specific OTRCs for one or more heads involved may comprise consulting a table containing nominal access times for various amounts of tracks to be traversed in accessing target data, extracting a time-to-data value from the table, referencing an adder specific to the head stored within buffer memory, and adding the adder to the time-to-data value.

In another embodiment, the DASD comprises a plurality of read heads. Determining the OTRC particular to the read head comprises measuring the OTRC of each of the plurality of read heads and recording the OTRCs on a reserved area on the data storage medium. Applying the OTRC in accessing data from the data storage medium comprises providing a control unit having access to a buffer memory within the DASD, an actuator arm for transporting the head across the data storage medium, and a voice coil motor for powering the arm. The method in this embodiment further comprises transferring the OTRCs from the reserved area to the buffer memory, receiving a block of target data to be accessed from the data storage medium into the control unit, determining the physical locations of the target data, accessing the specific OTRC for a head involved in accessing the target data, and calculating, using the OTRC of the involved head, an amount of current to transmit to the arm to transport the head to the target data with an optimized trajectory.

BRIEF DESCRIPTION OF THE DRAWINGS

In order that the manner in which the above-recited and other advantages and objects of the invention are obtained will be readily understood, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
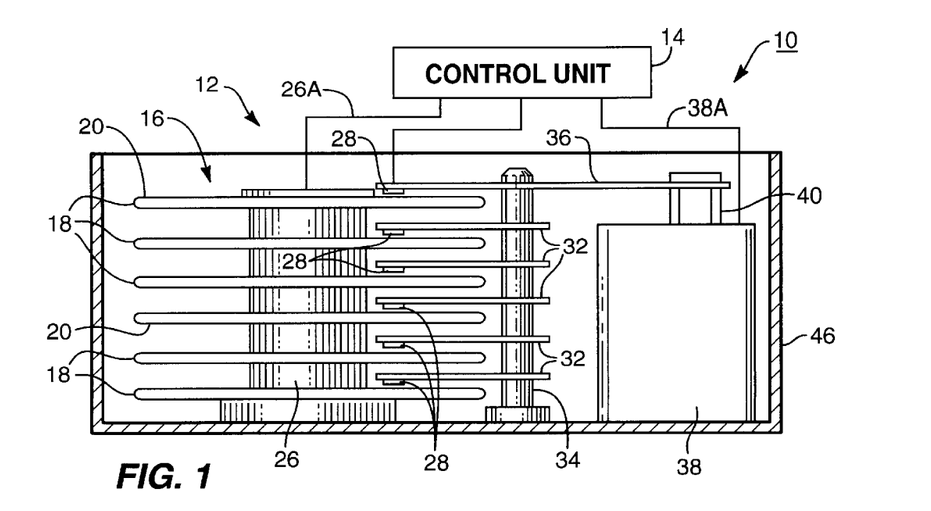
FIG. 1 is a partially schematic view showing components of a direct access storage device (DASD).

FIG. 1 shows a partly schematic block diagram illustrating the basic components of a direct access storage system (DASD) in the form of a magnetic hard disk drive unit 10. The disk drive unit 10 is shown including a data storage medium generally designated at 12 and a control unit generally designated at 14. The disk drive unit 10 is shown illustrated in a simplified form sufficient for an understanding of the present invention, and one example of the various types of DASDs which might employ the system and method of the present invention.

The disk drive unit 10 includes a stack 16 of disks 18 each having at least one magnetic storage surface 20. The disks 18 are mounted in parallel for simultaneous rotation on and by an integrated spindle and motor assembly 26. Data stored on the surface 20 of each disk 18 is read from and/or written to by a corresponding transducer head 28 movable across the disk surface 20.

The transducer heads 28 are mounted on flexure springs 30 carried by arms 32 collectively mounted for simultaneous pivotal movement about a support spindle 34. One of the arms 32 includes an extension 36 driven in a pivotal motion by a head drive motor 38. Although several drive arrangements are commonly used, the motor 38 in one embodiment comprises a voice coil motor 40 cooperating with a magnet and core assembly (not shown) operatively controlled for moving the transducer heads 28 in synchronism in a radial direction 45 (of FIG. 2) in order to position the transducer heads 28 in registration with data tracks 42 (of FIG. 2) to be followed and to access particular data sectors 44 of the data tracks 42.

The disk drive unit 10 is shown as a modular unit enclosed within a housing 46. The various components of the disk drive unit 10 are controlled in operation by signals generated by the control unit 14. These signals preferably include motor control signals on a line 26A and position control signals on a line 38A.

Figure 2:
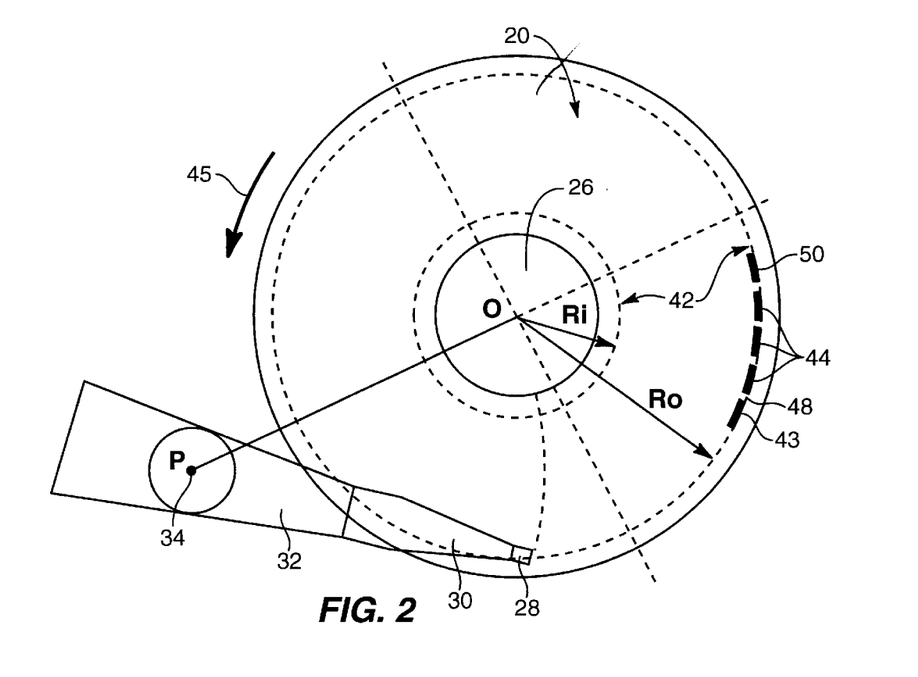
FIG. 2 is a top view of a DASD.

Referring to FIG. 2, numerous data tracks 42 are arrayed, each at a specific radial location, in a concentric pattern in the magnetic medium of each disk surface 20. A data cylinder includes a set of corresponding data tracks 42 for each data surface 20 in the data storage disk file 10. The data tracks 42 include a plurality of segments or data sectors 44, each containing a predefined amount of data storage locations for storing data records for later retrieval.

The data information tracks 42 are disposed at predetermined positions relative to a servo reference index. Each track 42 is broken into sectors 44. In FIG. 2, one sector 43 comprises SECTOR 0 with a fixed index or mark identifying it as the first data sector. The location of each next sector 44 is identified by a sector identification signal (SID) 48 read by the transducer heads 28 from the surfaces 20. One or more sectors 44 is preferably reserved as a reserved area 50 for storing data particular to a disk 18 or head 28.

Figure 3:
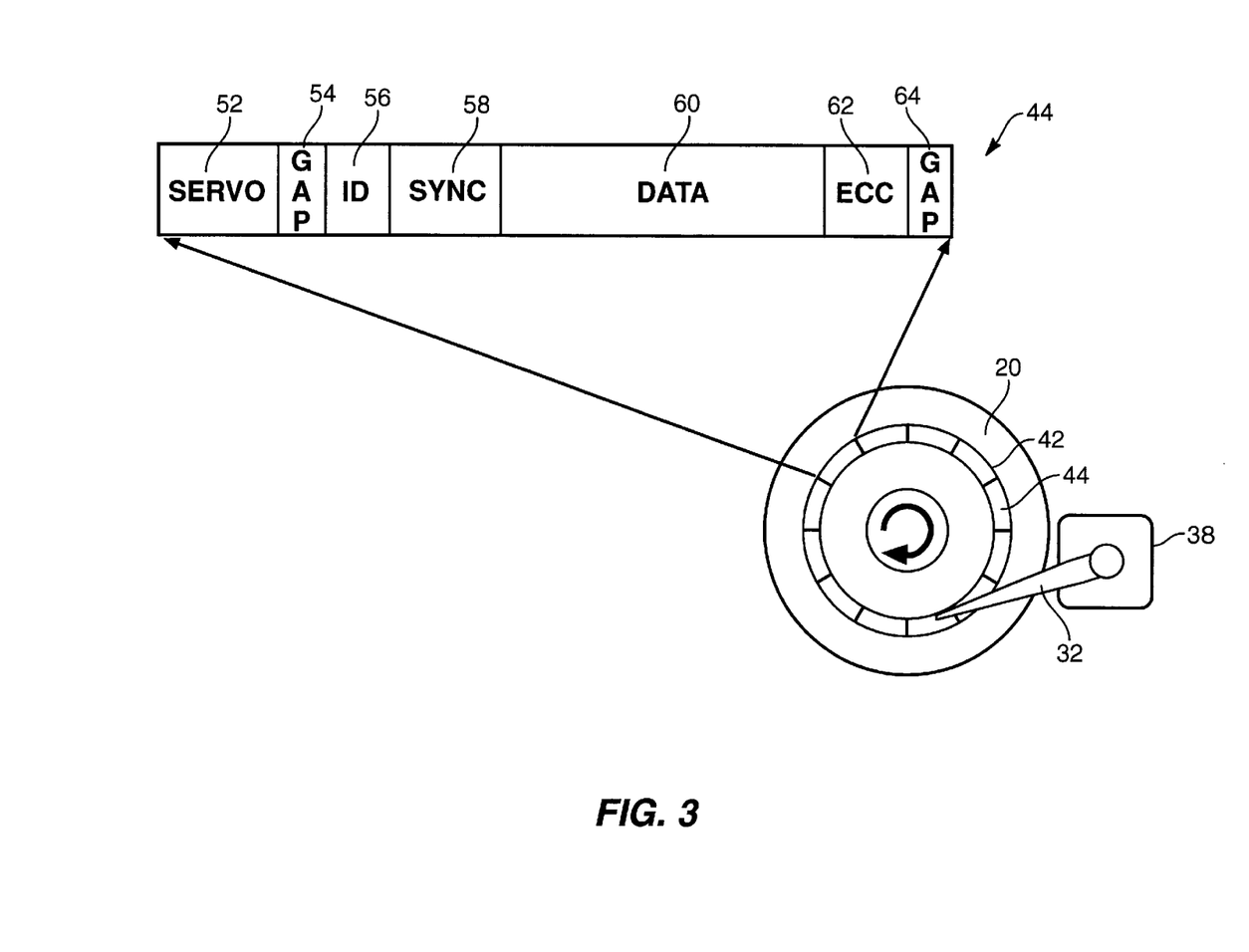
FIG. 3 is a schematic diagram illustrating one example of the contents of a sector within a track of a DASD.

FIG. 3 shows one arrangement of a sector 44 of a data track 42. As shown in FIG. 3, the sector 44 includes servo information 52, gaps 54, 64, an index or ID portion 56, sync information 58, data storage area 60, error correcting codes (ECC) 62. The sectors are repeated a fixed number of times within each track 42. In one embodiment, for example, 96 such sectors are formed in each track 42.

Figure 4:
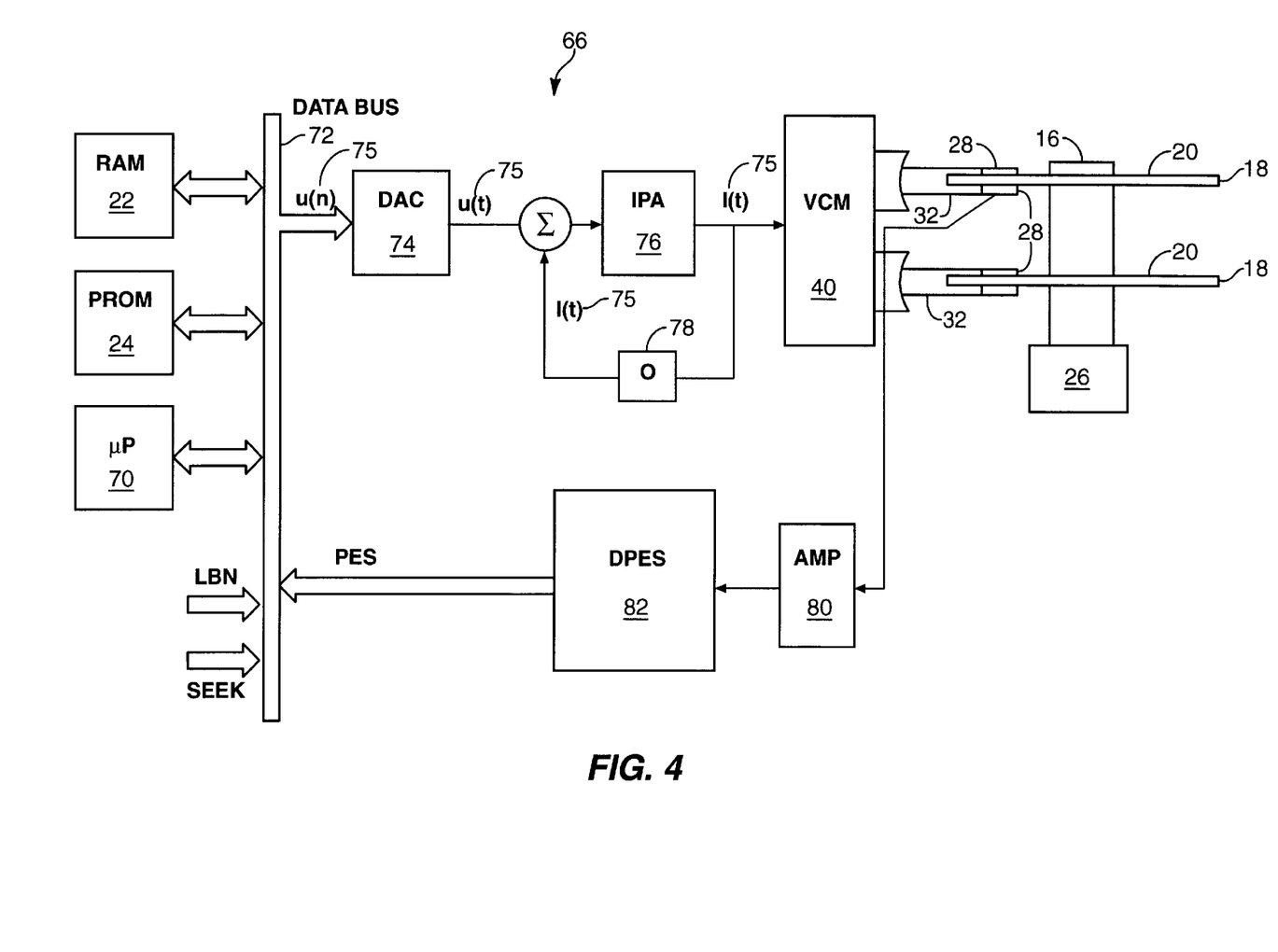
FIG. 4 is a schematic block diagram illustrating various components of a control unit of a DASD.

FIG. 4 shows one embodiment of a servo control loop 66 of a standard disk drive unit 10. Shown therein is the stack 16 of disks 18 having surfaces 20. A spindle motor assembly 26 is provided for rotating the disks 18. Heads 28 are mounted on arms 32, which are driven by the voice coil motor 40. The control unit 14, in this embodiment is represented as a microprocessor 70, connected by a bus 72 with RAM memory 22 and ROM memory 24.

Control signals v(n) 75 from the microprocessor 70 are fed into a digital to analog converter 74, which in turn communicates with a current driver 76 that generates appropriate current signals I(t) 75. The current signals 75 are fed into the voice coil motor 40 through a feedback loop having a gain 78.

Completing the servo control loop 66 is a position error signal passed from the head 28 to an amplifier 80 and a position error decoder 82. The position error decoder 82 generates digital error signals upon receipt of position signals from head 28 and transfers them as PES signals to the data bus 72 and back to the processor 70. The processor 70 uses these PES signals as feedback in generating the proper control signals 75 to control the voice coil motor 40.

Figure 5:
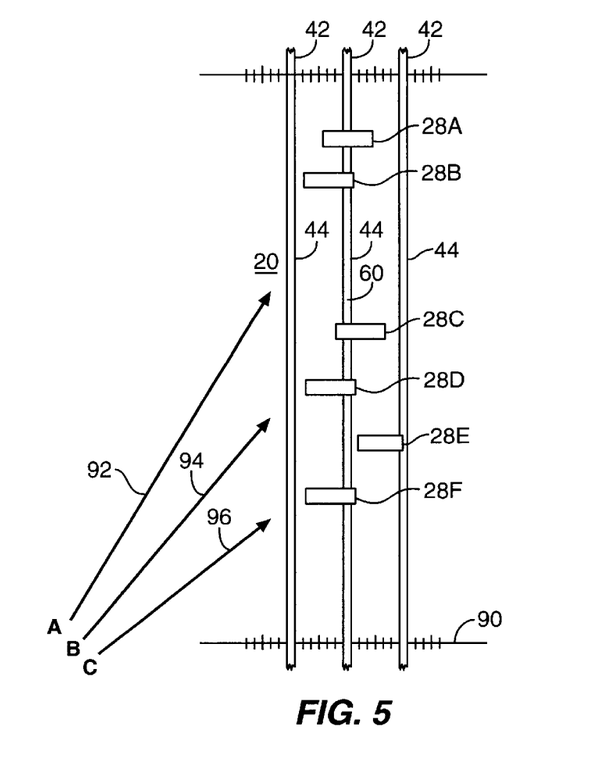
FIG. 5 is a top view of a plurality of tracks of a DASD illustrating alternate approach angles of a head to target data stored on the tracks.

FIG. 5 shows how knowing the particular off-track read capability (OTRC) of a head 28 can be used in a access operation. Shown therein is a disk surface 20 having thereon sectors 44 of tracks 42. SID marks 90 are also shown as used for references of head positioning. The head 28 is shown at various positions 28A through 28F. Each position is a result of one of three reference trajectories, A 92, B 94, or C 96. The first head position for each trajectory shows the point at which the head first begins reading the data 60 on the selected data track 42 (the middle track) without errors from reading the data on a proceeding track. The second head position for each trajectory shows the maximum overshoot of the head 28 for each trajectory.

Figure 6:
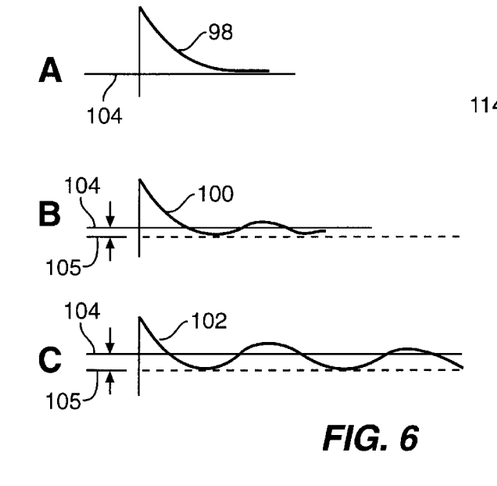
FIG. 6 is a graphical depiction of the approach angles of FIG. 5.

Trajectory A is the least aggressive. The head 28 reaches a position 28A where it can read the data 60 slowest of the three trajectories, but settles onto a desired position 28b the quickest. FIG. 6 shows a chart of positioning of the head 28 for each of the three trajectories. A line 104 shows the desired positioning of the head 28, while a line 105 shows the maximum overshoot. As can be seen, the maximum overshoot 105 is the same as the desired positioning 104 for trajectory A.

Trajectory C is overly aggressive. Trajectory C reaches a position 28F where it can read the data 60 most quickly of the three trajectories, but overshoots the data track 42 to a position 28E pass partially over an adjoining data track 42, thus causing an error condition. Trajectory C has the largest overshoot 105 of the three reference trajectories.

Trajectory B has the most desirable trajectory. It arrives earlier at a read position 28A than trajectory A, but at its maximum overshoot position 28C is still positioned to read the data 60. Thus, some overshoot 105, as shown by chart B of FIG. 6 is desirable.

In order to properly drive the seek operation, under the present invention, the processor 70 (or other suitable type of controller 14) is provided with the specific OTRC for the read head 28 that is to read the data 60 on a disk surface 20. Thus, in one embodiment, the processor 70 employs the OTRC to determine more accurately how fast to drive the arm 32 containing the head 28 and when to begin damping the speed of the arm 32.

In one embodiment, the OTRC is stored as an indicator within memory of the control unit 14, preferably within the RAM 22. One example of an indicator is the table 114 of FIG. 6A. The table 6A references distance 106 to the target in number of data tracks that must be traversed to arrive at the target data 60. The number of data tracks is accompanied by a corresponding specific time-to-data 108 (or an appropriate indicator or measure thereof). Preferably, the table is stored in a compressed form.

Figure 6A:
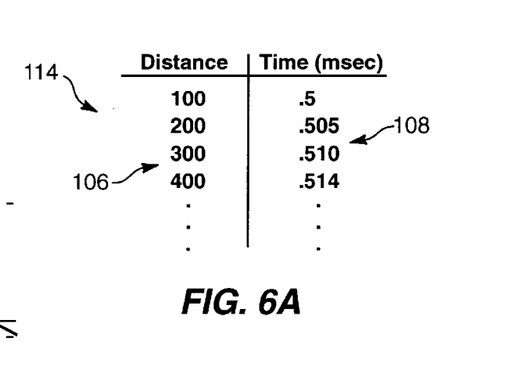
FIG. 6A is a graph of time-to-data times for a head.

The table 114 may be used in several manners. In a first embodiment, the OTRC is measured for each head 28 and an appropriate table 114 for each head 28 is stored in the RAM memory 22. In a second embodiment, the OTRC is measured for each head 28, and a pointer is stored in RAM memory. A series of tables is stored in RAM 22 or ROM 24, each table 114 having thereon the corresponding values for a different approximate OTRC. The pointer for each head points to the appropriate table 114.

In a third embodiment, a single table 114 containing nominal values of time-to-data is stored in RAM 22 or ROM 24. The OTRC indicators comprise adders to be added to the nominal values according to the OTRC for each head. So, for example, if 1000 tracks must be traversed, and the table gives a time of 10 mSec to traverse 1000 tracks, the 10 mSec time is first referenced. Then the adder is referenced for the particular head 28. If the adder were 2 mSec, the 2 mSec is added to 10 mSec, for a total access time of 12 mSec. This time is then used by the microprocessor in seeking or scheduling seeks.

Figure 7:
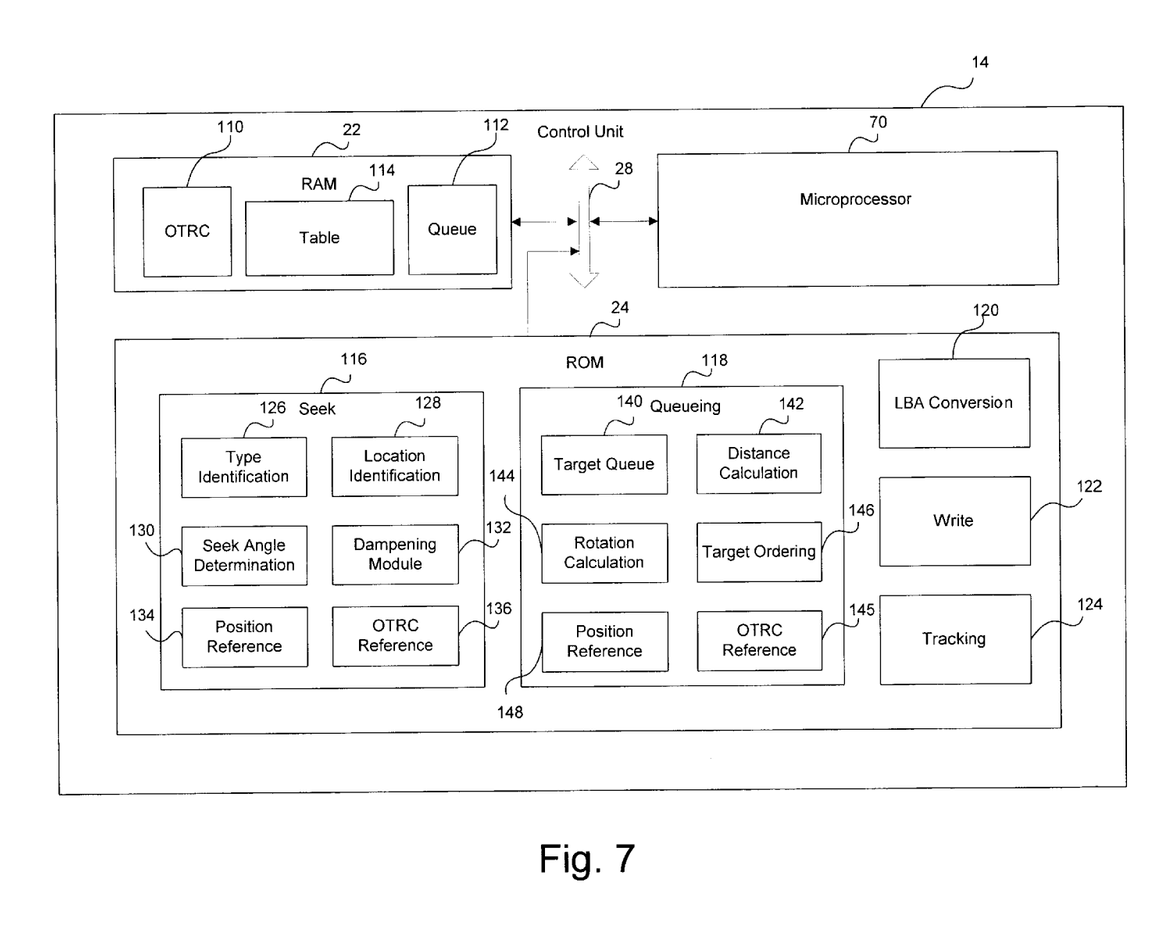
FIG. 7 is a schematic block diagram illustrating one embodiment of modules within a control unit of the present invention.

Referring to FIG. 7, shown therein is one embodiment of a control unit 14 of the present invention. The control unit 14 of FIG. 7 is shown provided with Ram memory 22, ROM memory 24, a data bus 28, and a microprocessor 70. The RAM 22 at certain times during operation stores therein the table 114, an OTRC indicator 110, and a queue 112.

The ROM stores the microcode upon which the microprocessor 70 operates. In the depicted embodiment, the ROM is shown storing therein a seek module 116, a queuing module 118, an LBA conversion module 120, a write module 122, and a tracking module 124. The seek module 116 is used to satisfy seek operations. The Queuing module 118 is employed in one embodiment to satisfy random queued seek operations. The LBA conversion module is used to convert logical block addresses received from an operating system to physical addresses in numbered pairs or triplets corresponding to disk or head, track or cylinder, and sector. LBA conversion modules are well know and will not be discussed here in detail.

The write module is used to coordinate writing of data to the disk surface 20 and is configured in any standard manner known in the art. The tracking module 124 may also be a standard tracking control loop or algorithm as known in the art. Under one embodiment, the tracking algorithm may be modified to employ the OTRC. This is done similarly to the changing the seeking algorithm: by using the OTRC to determine an optimal control loop. This control loop is specified as a set of parameters that are incorporate the OTRC. The paramaters are stored in RAM and selected according to the particular OTRC measured for the head being referenced.

The seek module 116 in one embodiment comprises a standard seek algorithm as currently employed in the prior art. Under the present invention, the seek module 116 is modified to utilize the head-specific OTRC. Thus, the seek module 116 may be provided with a type identification module 126 to determine which type of data access is being requested. For instance, a data access operation may be a sequential data access, a random queued access operation, or a random unqueued access operation. Each operation may be treated differently under the present invention.

A location identification module 128 is preferably provided and is preferably used to determine where the data 60 to be read is located. Preferably, the location module 128 receives the physical address from the LBA conversion module after it is received from the computer operating system. A seek angle determination module 130 may be used to determine how much current 75 to power the motor 26 with according to an optimal velocity. This velocity may vary according to how many tracks the head 28 must traverse and the particular OTRC of the head.

Accordingly, a position reference 134 is used to determine where the head 128 is, and OTRC reference module 136 is used to determine the OTRC, usually by referencing the table 114 or OTRC indicator 110 from RAM. The seek angle determination module references these values to determine the proper seek angle. Similarly, a dampening module 132 may also reference these references to determine when to begin dampening speed of the head 28 and the magnitude of the damping to achieve the optimal trajectory (i.e., trajectory B of FIG. 6.

The Queuing module 118 may comprise a standard queuing algorithm modified in accordance with the present invention. In one embodiment, the queuing module comprises a target queue, which is preferably a data structure for dealing with a queue 112 of data received from an operating system. Typically, the queued data is a set of data located at different target addresses for which a specific order of receipt of the data is not required. The queuing module 118 sends the target data back in the most efficient order.

A distance calculation module 142 determines how many tracks must be traversed. A rotation calculation module determines where the target data will be when the head arrives upon the target track. A target ordering module 146 utilizes this information, together with position information from a position reference module 148 and the OTRC of the head 28 received through a OTRC reference module 145 from RAM 22 to determine the ordering of seeks of data in the queue. Preferably, the data that can be acquired in the shortest amount of time is referenced first, and the determination is repeated to determine which data in the queue 112 is to be referenced next.

Figure 8:
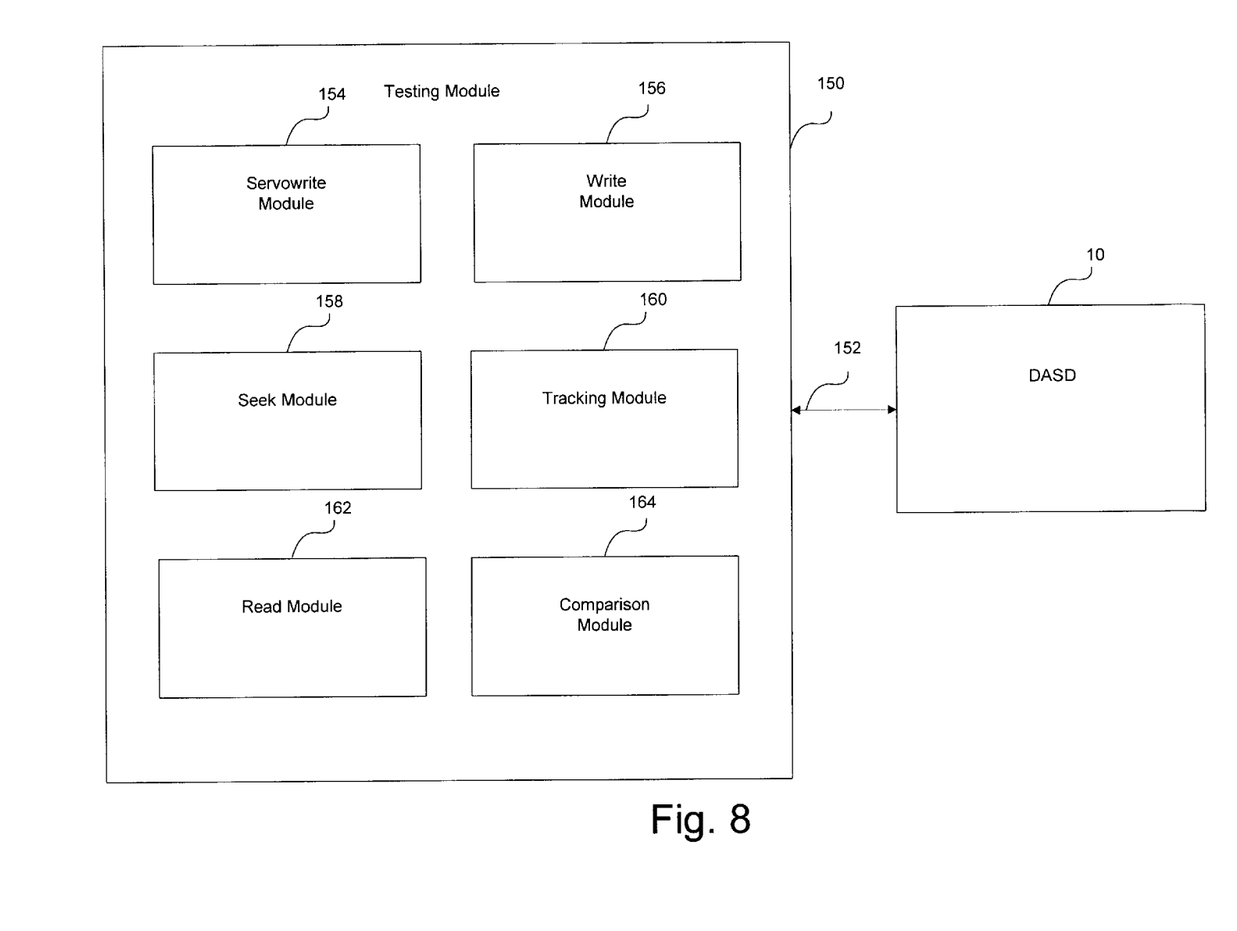
FIG. 8 is a schematic block diagram illustrating a testing module in accordance with one embodiment of the present invention.

Referring to FIG. 8, shown therein is a testing module 150. The testing module 150 is preferably a standard testing module as used during manufacture of DASDs. In one embodiment, the testing module is used to measure and record the OTRC of each head 128 of a disk drive unit 10 or other DASD. The testing module is shown provided with a tracking module 144, a write module 156, a seek module 158, a servowrite module 160, a read module 162, a comparison module 164, and a connection 152 for connecting with the disk drive unit 10 to be tested.

In one embodiment, the testing module 150 is used for determining the OTRC particular to a read head 128 in a disk drive unit 10 or other DASD. The steps of determining the OTRC and subsequently applying the OTRC in accessing data from the disk surface will be discussed in conjunction with FIG. 9.

Figure 9:
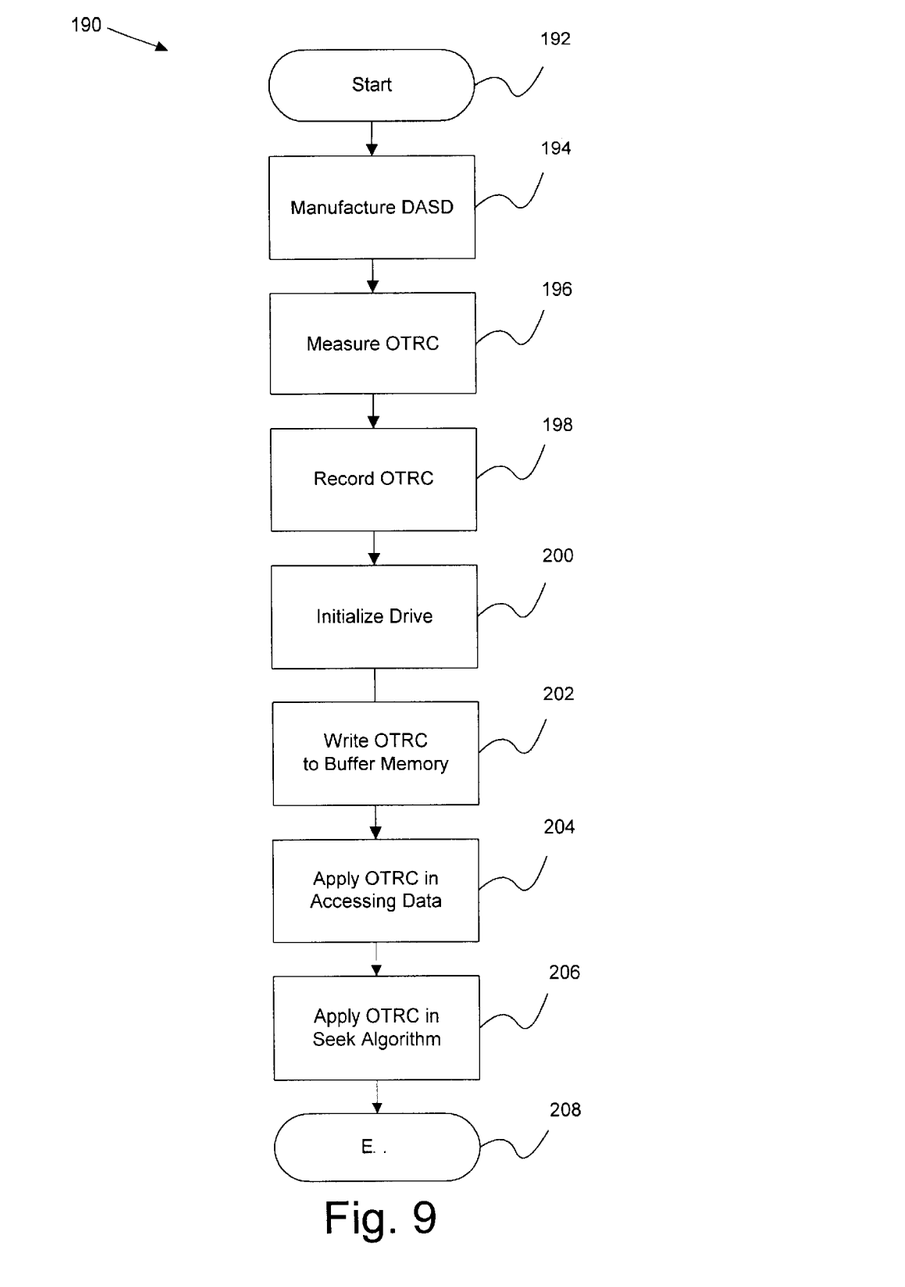
FIG. 9 is a schematic flow chart diagram illustrating one embodiment of a method of employing off-track read capability of a head.

FIG. 9 is a schematic flow chart diagram illustrating one method 170 of employing a head-specific OTRC to access data stored on a surface 10 of a DASD (e.g., disk drive unit 10). The method 170 begins at a start step 192 and progresses to a step 194 where the DASD 10 is manufactured. The DASD 10 is preferably manufactured in a standard manner, other than modifications as indicated herein for providing for referencing of head-specific OTRC information in accessing data.

At a step 196, the OTRC for each head of each DASD 10 manufactured is measured. Preferably, this comprises using the testing module 150 of FIG. 8. In so doing, the servowrite module 154 is used to write servo information on the disk surface 20 for use by the tracking module 160. A write module 156 is used to write data 60 to one or more tracks 22 of the head surface 20. A seek module 158 is used to cause a seek operation of the data 60. In so doing, a read module 162 is used to read the data 60. The tracking module 160 causes reads to be conducted at certain distances away from track center. The comparison module 164 determines most distant consistently successful distance for each head and calculates or otherwise references a corresponding OTRC.

At a step 198, the OTRC information for each head is thusly calculated and is then written by the write module 156 to the reserved area 43 (of FIG. 2) of the disk drive 10. The OTRC information can be stored using one of the three embodiments of OTRC indicator formats discussed for FIG. 6A or could utilize some other suitable manner of referencing the OTRC for each head. At a step 200, the disk drive unit 10 is initialized. Preferably, as indicated by a step 202, this comprises transferring the OTRC information 110 from the reserved area 43 to local memory. In one embodiment, the local memory comprises RAM 22, which may be RAM 22 used for buffering information to a computer processor.

At a step 204, the OTRC is applied in accessing data from the disk drive unit 10. This may be during sequential data accesses, random queued accesses, random unqueued accesses, data seeking, and/or data tracking. In one embodiment, the OTRC is referenced by the seek algorithm to determine how aggressively to conduct the seek and/or to conduct damping of the arm 32. Applying the OTRC in the seek algorithm is further illustrated by a method 170 of FIG. 10.

Figure 10:
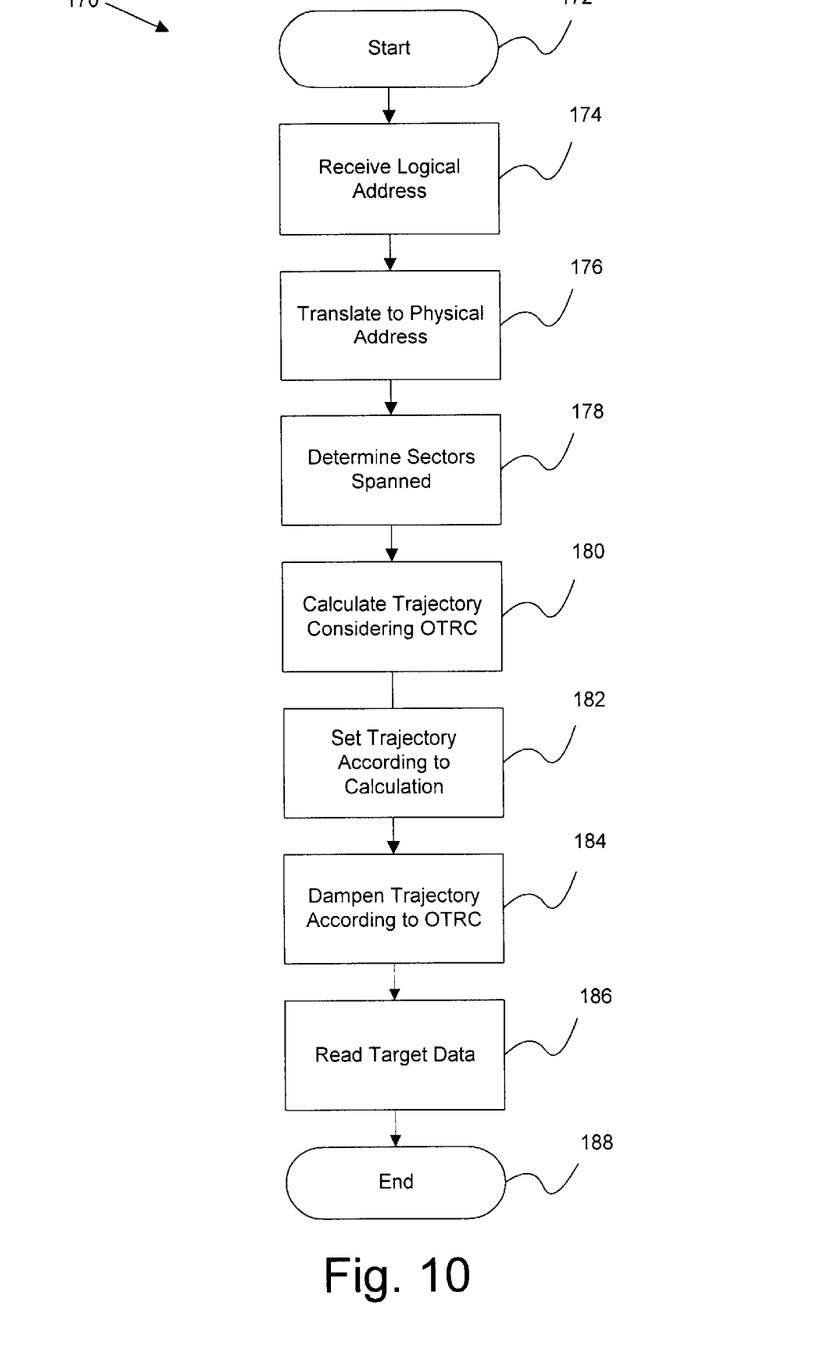
FIG. 10 is a schematic flow chart diagram illustrating one embodiment of a method of applying a head-specific OTRC in scheduling seeks.

The method 170 of FIG. 10 starts at a step 172 and progresses to a step 174 where the logical addresses of data requested by the operating system is received. Typically, this comprises receiving the LBA onto the data bus 72 from the computer host. The LBA is received by the LBA conversion module of FIG. 7 and converted at a step 176 into a physical address. It is then transferred to the location identification module.

At a step 178, the number of sectors to be spanned is determined. In one embodiment, this comprises determining the present position of the head 28 with the position reference module 134 and comparing that position to the physical address held by the location identification module. Subsequently, at a step 180, the trajectory is calculated. In so doing, standard seek algorithms are modified to consider the OTRC. This is preferably conducted with the seek angle determination module 130.

At a step 184, the dampening module 132 is used to calculate the timing and degree of dampening. Once again, this preferably takes into account the OTRC. At a step 186, the target data is read and returned to the operating system. At a step 188, the method 170 ends.

Figure 11:
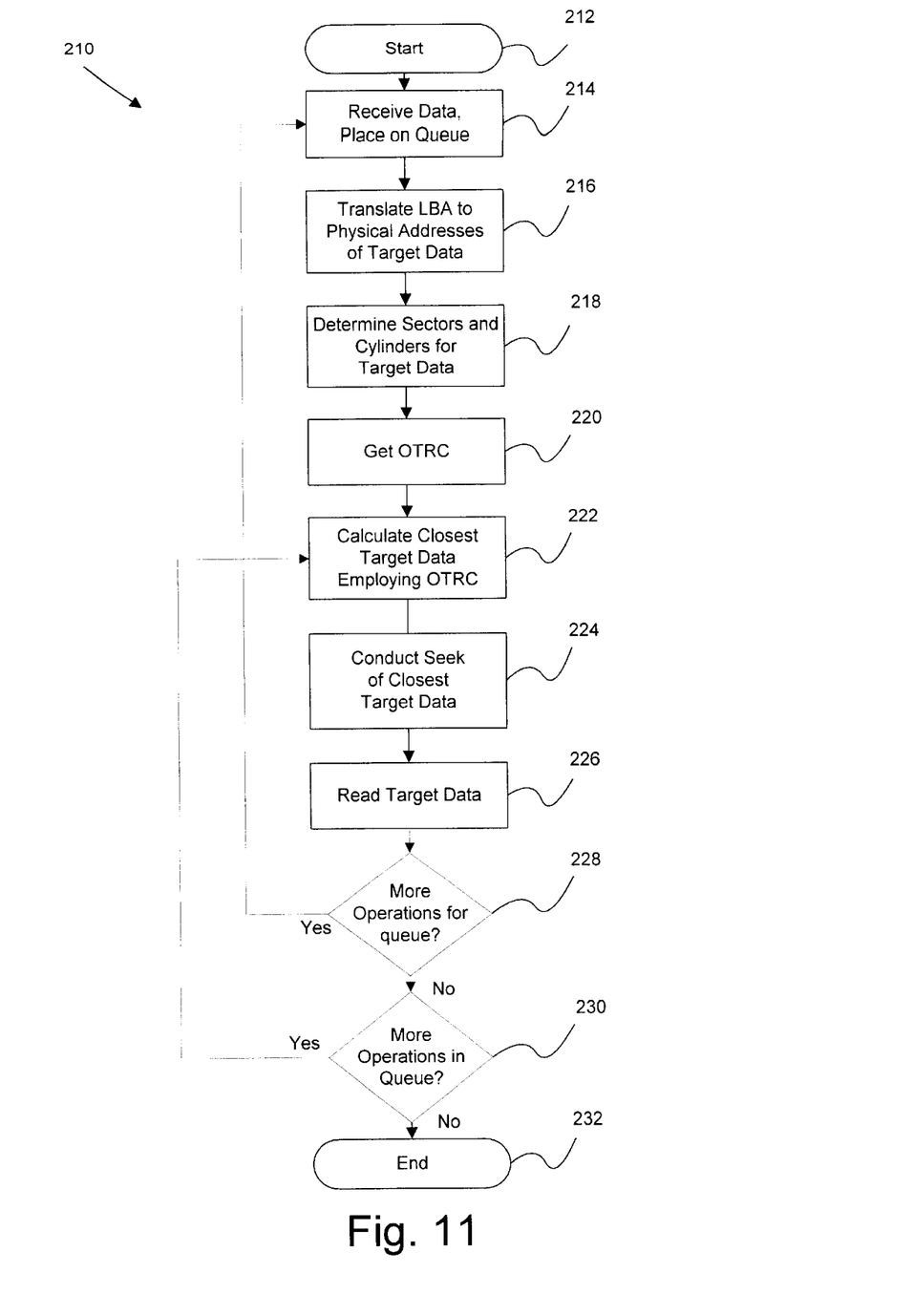
FIG. 11 is a schematic flow chart diagram illustrating one embodiment of a method of scheduling seeks in a random queued seek operation employing a head-specific OTRC.

FIG. 11 is a method 210 of scheduling a random scheduled seek operation. In one embodiment, the method 210 is conducted by the queuing module 118 of FIG. 7. The method 210 can be considered one specific example of the step 204 of applying the OTRC to access data of the method 190 of FIG. 9.

The method 210 begins at a start step 212 and progresses to a step 214. At the step 214, the various data 60 to be accessed are received and placed on the queue 112 with the target queue module 140. At a step 216, the LBA for each set of data 60 on the queue 112 is translated to physical address with the LBA conversion module 120. At a step 218, the sector numbers and cylinder numbers of each physical address is determined and stored.

At a step 220, the OTRC information 110 for the head 128 involved with reading each block of data 60 is received. Examples of the manners of storing and receiving the OTRC information 110 are given above with respect to the discussion of FIG. 6A and will be discussed below in more detail with respect to FIGS. 12 and 13.

At a step 222, the closest target data is calculated employing the OTRC. This in one embodiment comprises determining the current location of the head 128 with the position reference module 148, specifically, the track and sector, and comparing that data with the track and sector data for each data block 60, utilizing the specific OTRC to more closely determine time-to-data for each data block. In so doing, rotational information is considered, as provided by the rotation calculation module 144. Thus, if a head would arrive just as data passed by in its rotation, the extra time to wait for the data to revolve around again under the head is considered. The block of target data 60 that can be accessed most quickly is returned.

At a step 224, a seek of the target data returned from the calculation of step 222 is conducted. This may be a standard seek, or may employ the OTRC as given by way of example in the method 170 of FIG. 10. At a step 226, the target data 60 is read. At a step 228, the method 210 checks to see if there are more operations to add to the queue 112. If there are more operations, the method 210 loops back to step 214 and receives the new data access operations and adds them to the queue. If there are no more operations to be added, the method 210 step 230. At the step 230, the method 210 checks to see if the queue is empty. If so, the method 210 branches to block 222, and if not, the method 210 progresses to a block 232 where it waits for more operations to be received.

Figure 12:
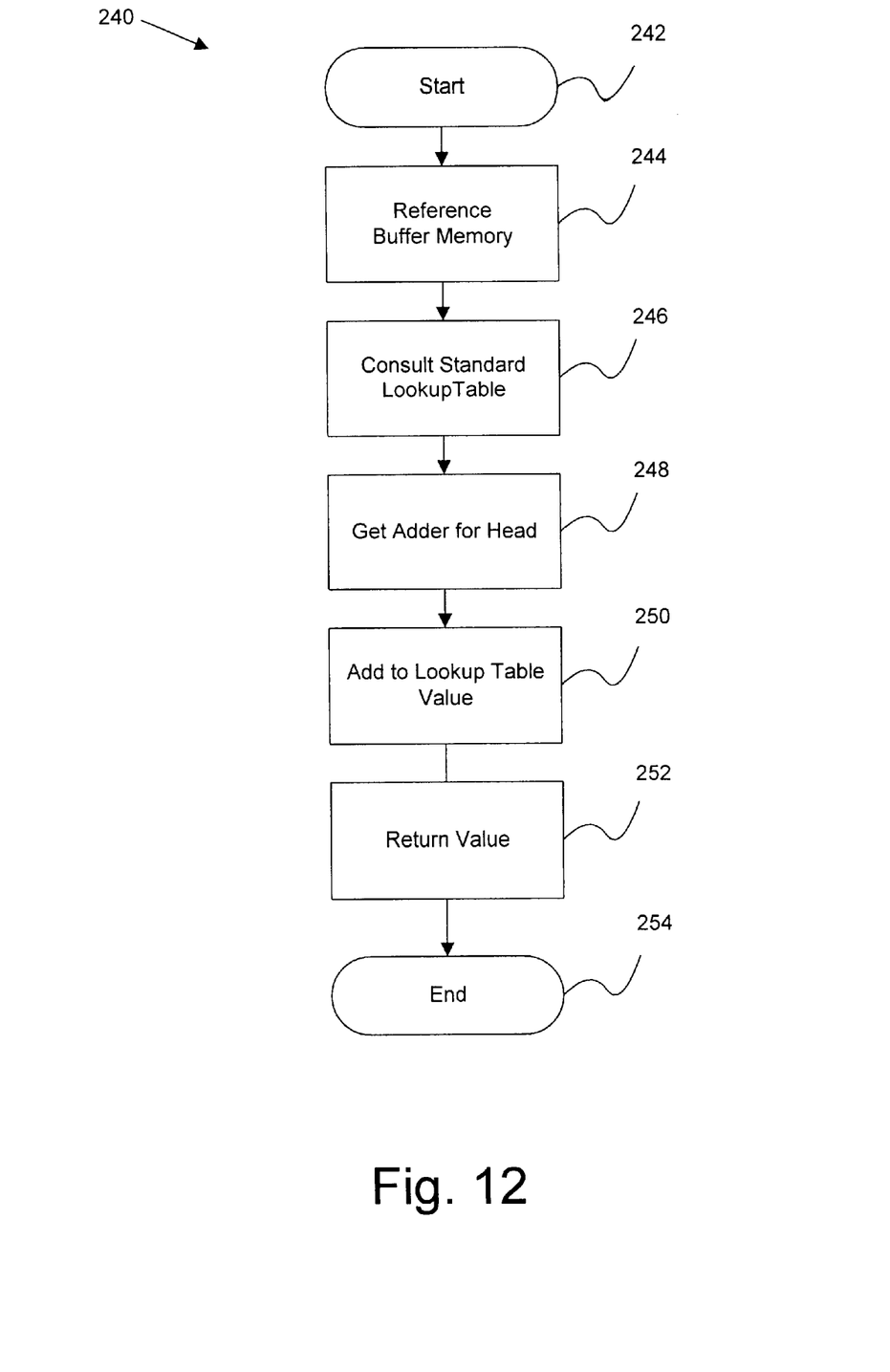
FIG. 12 is a schematic flow chart diagram illustrating one embodiment of a method of referencing a head-specific OTRC.

FIG. 12 illustrates a method 240 of retrieving OTRC data and may be employed as one manner of getting the OTRC of step 220 of the method 210 of FIG. 11. The method 240 starts at a step 242 and progresses to a step 244. At the step 244, buffer memory 22 is referenced. At a step 246, a standard lookup table 114 is referenced and the standard time-to-data value for the number of tracks to be traversed is extracted. At a step 248, the OTRC indicator 110 in the form an adder value as described above is located within RAM memory (including, for example, buffer memory). The adder is added to the lookup table value at a step 250 and at a step 252, the value is returned for use by the requesting function. At a step 254, the method 240 ends.

Figure 13:
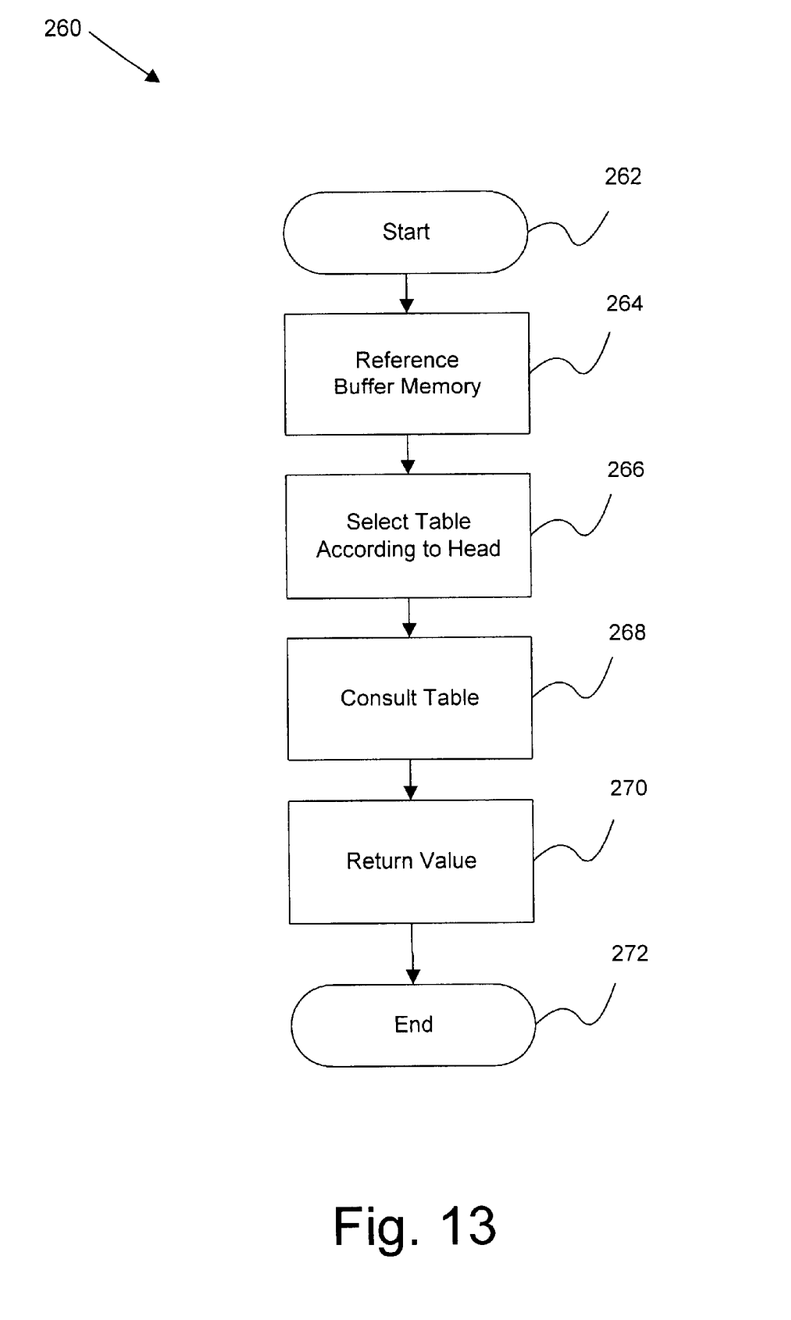
FIG. 13 is a schematic flow chart diagram illustrating a further embodiment of a method of referencing a head-specific OTRC.

FIG. 13 illustrates an alternate method 240 of retrieving OTRC data and may be employed as one manner of getting the OTRC of step 220 of the method 210 of FIG. 11. The method 260 starts at a step 262 and progresses to a step 264. At the step 264, Ram memory 22, and optionally, buffer memory, is referenced. At a step 266, a table 114 is referenced. The table in one embodiment is specific to the head 28 for which the OTRC data is being retrieved. At a step 268, the table 114 is consulted, at a step 270, the value is returned, and at a step 272, the method 260 ends. As an alternative, step 266 could comprise retrieving a pointer particular to a head 28. The pointer points to one of a plurality of tables of time-to-data values for standard values of OTRCs.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by U.S. Letters Patent is:

1. A method for employing a customized off-track read capability (OTRC) value in accessing data on a direct access storage device (DASD), the method comprising:
   providing a DASD having a rotating data storage medium and a read head positionable for interaction with the data storage medium;
   determining an OTRC value specific to the read head, the OTRC value affected at least in part by the physical size of the read head; and
   applying the specific OTRC value in accessing data from the data storage medium.

2. The method of claim 1, wherein applying the OTRC value comprises referencing the OTRC value to generate an improved read time estimate for optimal scheduling of data operations.

3. The method of claim 1, wherein applying knowledge of the OTRC value in accessing data from the DASD comprises applying the OTRC value dynamically during a seek operation.

4. The method of claim 1, wherein determining the OTRC value comprises measuring the OTRC value of the read head during manufacturing of the DASD.

5. The method of claim 1, further comprising providing a servo control loop within the DASD, and wherein applying the OTRC value in accessing data from the data storage medium comprises applying the OTRC value to determine at least one parameter of the servo control loop.

6. The method of claim 1, wherein applying the OTRC value comprises applying the OTRC value to a data seek algorithm to determine an optimal trajectory of the head to the target data.

7. The method of claim 1, wherein applying the OTRC value comprises applying the OTRC value during a random queued seek operation.

8. The method of claim 7, wherein applying the OTRC value comprises applying the OTRC value to a seek queuing algorithm to determine the order of seeking a plurality of blocks of target data.

9. The method of claim 1, wherein applying the OTRC value comprises referencing a table of time-to-data for various numbers of tracks traversed, the table incorporating the OTRC value specific to the head.

10. The method of claim 1, wherein applying the OTRC value comprises referencing a standard table of time-to-data values for various numbers of tracks traversed and applying an adder corresponding to the OTRC value.

11. The method of claim 1, wherein applying the OTRC value comprises referencing from among a plurality of tables of time-to-data for various numbers of tracks traversed, each of the plurality of tables specific to a OTRC value, a table with an OTRC value specific to the head.

12. The method of claim 1, wherein the DASD comprises a plurality of read heads, and wherein determining the OTRC value particular to the read head comprises:

measuring the OTRC value of each of the plurality of read heads, and recording the OTRC values on a reserved area on the data storage medium; and wherein applying the OTRC value in accessing data from the data storage medium comprises:

providing a control unit having access to a buffer memory within the DASD, transferring the OTRC values from the reserved area to the buffer memory, receiving a queue of target data to be accessed from the data storage medium into the control unit, determining the physical locations of the target data, accessing the specific OTRC values for one or more heads involved, determining, using the one or more OTRC values, which of the target data can be accessed most quickly, and accessing said target data that can be accessed most quickly prior to the other target data.

13. The method of claim 12, wherein accessing the specific OTRC values for one or more heads involved comprises consulting a table specific to the head, the table containing access times for various amounts of tracks to be traversed in accessing target data.

14. The method of claim 12, wherein accessing the specific OTRC values for one or more heads involved comprises consulting a table containing nominal access times for various amounts of tracks to be traversed in accessing target data, extracting a time-to-data value from the table, referencing an adder specific to the head stored within buffer memory, and adding the adder to the time-to-data value.

15. The method of claim 1, wherein the DASD comprises a plurality of read heads and wherein determining the OTRC value particular to the read head comprises measuring the OTRC value of each of the plurality of read heads and recording the OTRC values on a reserved area on the data storage medium, and wherein applying the OTRC value in accessing data from the data storage medium comprises providing a control unit having access to a buffer memory within the DASD, an actuator arm for transporting the head across the data storage medium, and a voice coil motor for powering the arm, and transferring the OTRC values from the reserved area to the buffer memory, receiving a block of target data to be accessed from the data storage medium into the control unit, determining the physical locations of the target data, accessing the specific OTRC value for a head involved in accessing the target data, and calculating, using the specific OTRC value of the involved head, an amount of current to transmit to the arm to transport the head to the target data with an optimized trajectory.

16. A direct access storage device (DASD) comprising:

a rotating data storage medium;

a read head positionable for interaction with the data storage medium; and a control unit for positioning the read head with respect to the data storage medium, the control unit comprising:

an off-track read capability (OTRC) value storage module configured to store an indicator of an OTRC value specific to the read head, the OTRC value affected at least in part by the physical size of the read head; and an access module configured to apply the specific OTRC value in accessing data from the data storage medium.

17. The DASD of claim 16, wherein the access module comprises a seek module configured to apply the OTRC value dynamically during a data seeking operation.

18. The DASD of claim 16, wherein the access module comprises a tracking module configured to apply the OTRC value dynamically during a data tracking operation.

19. The DASD of claim 16, wherein the OTRC value comprises a value measured during manufacturing of the DASD.

20. The DASD of claim 16, wherein the control unit further comprises a servo control loop configured to apply the OTRC value to determine at least one parameter of the servo loop.

21. The DASD of claim 16, wherein the control unit comprises a data seek algorithm and is configured to apply the OTRC value to the data seek algorithm to determine an optimal trajectory of the head to the target data.

22. The DASD of claim 16, further comprising a queuing module within the control unit, the queuing module configured to apply the OTRC value in ordering a random queued seek operation.

23. The DASD of claim 16, wherein the OTRC value storage module comprises a table of time-to-data values for various numbers of tracks traversed, the table incorporating the OTRC value specific to the head.

24. The DASD of claim 16, wherein the OTRC value storage module comprises a standard table of time-to-data values for various numbers of tracks traversed and an adder corresponding to the OTRC value.

25. The DASD of claim 16, wherein the OTRC value storage module comprises a plurality of tables of time-to-data for various numbers of tracks traversed, each of the plurality of tables specific to an OTRC value.

26. The DASD of claim 16, further comprising:

a plurality of read heads, each read head positionable for interaction with the data storage medium;

a buffer memory in communication with the control unit;

an OTRC value indicator specific to each read head, the OTRC values stored in the buffer memory; and a queuing module within the control unit, the queuing module configured to receive a queue of target data to be accessed from the data storage medium into the control unit, determine the physical locations of the target data, access the specific OTRC values for one or more heads involved, determine, using the one or more specific OTRC values, which of the target data can be accessed most quickly, and access said target data that can be accessed most quickly prior to the other target data.

27. The DASD of claim 26, wherein the OTRC value indicator specific to each read head comprises a table specific to the head, the table containing access times for various amounts of tracks to be traversed in accessing target data.

28. The DASD of claim 26, wherein the OTRC value indicator specific to each read head comprises an adder specific to the head stored within buffer memory, and wherein the queuing module is further configured to consult a table containing nominal access times for various amounts of tracks to be traversed in accessing target data, extract a time-to-data value from the table, reference the adder, and add the adder to the time-to-data value.

29. The DASD of claim 16, further comprising:
   a plurality of read heads, each read head positionable for interaction with the data storage medium;
   an actuator arm for transporting the head across the data storage medium;
   a voice coil motor for powering the arm, the controller configured to control the amount of current provided to the arm;
   a buffer memory in communication with the control unit;
   an OTRC value indicator specific to each read head, the OTRC values stored in the buffer memory; and
   a seeking module within the control unit, the seeking module configured to receive a block of target data to be accessed from the data storage medium into the control unit, determine the physical locations of the target data, access the specific OTRC value for a head involved in accessing the target data, and calculate, using the OTRC value of the involved head, an amount of current to provide to the arm to transport the head to the target data with an optimized trajectory.

30. The DASD of claim 16, wherein the access module is further configured to apply the OTRC value to generate an improved read time estimate for optimal scheduling of data operations.

31. A direct access storage device (DASD) comprising:
   a rotating data storage medium;
   a read head positionable for interaction with the data storage medium;
   an actuating arm for positioning the read head;
   a voice coil motor adapted to rotationally position the arm; and
   a control unit adapted to provide selected amounts of current to the arm to position the read head with respect to the data storage medium, the control unit comprising:
      an off-track read capability (OTRC) value storage module configured to store an indicator of an OTRC value specific to the read head, the OTRC value affected at least in part by the physical size of the read head; and
      an access module configured to apply the OTRC value in accessing data from the data storage medium.

* * * * *